Jan. 13, 1931.  M. H. RICE  1,788,593
BALANCED VALVE
Filed Aug. 22, 1929   3 Sheets-Sheet 1
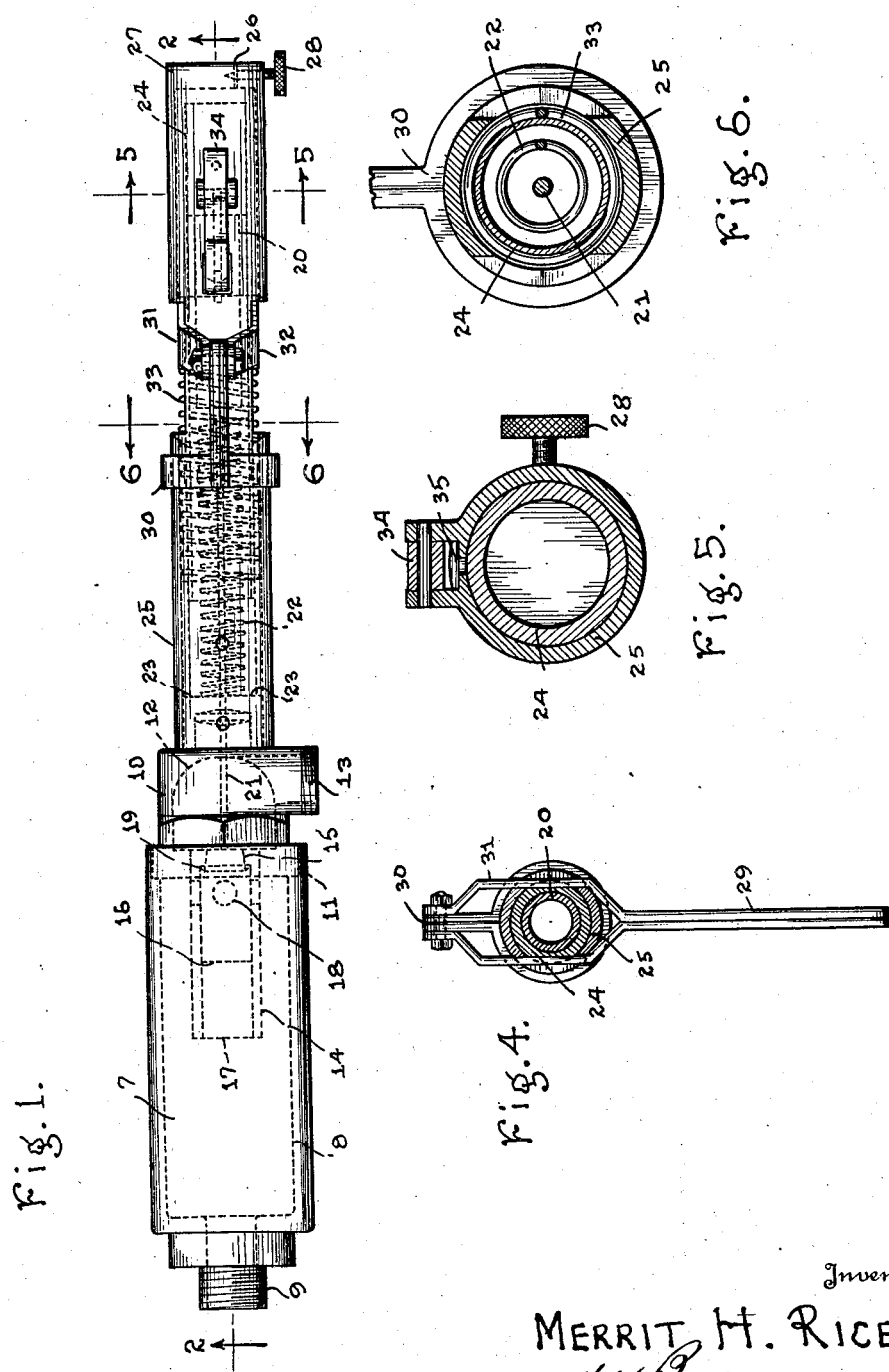
Inventor
MERRIT H. RICE
By
Attorney Jan. 13, 1931. M. H. RICE 1,788,593
BALANCED VALVE
Filed Aug. 22, 1929 3 Sheets-Sheet 2
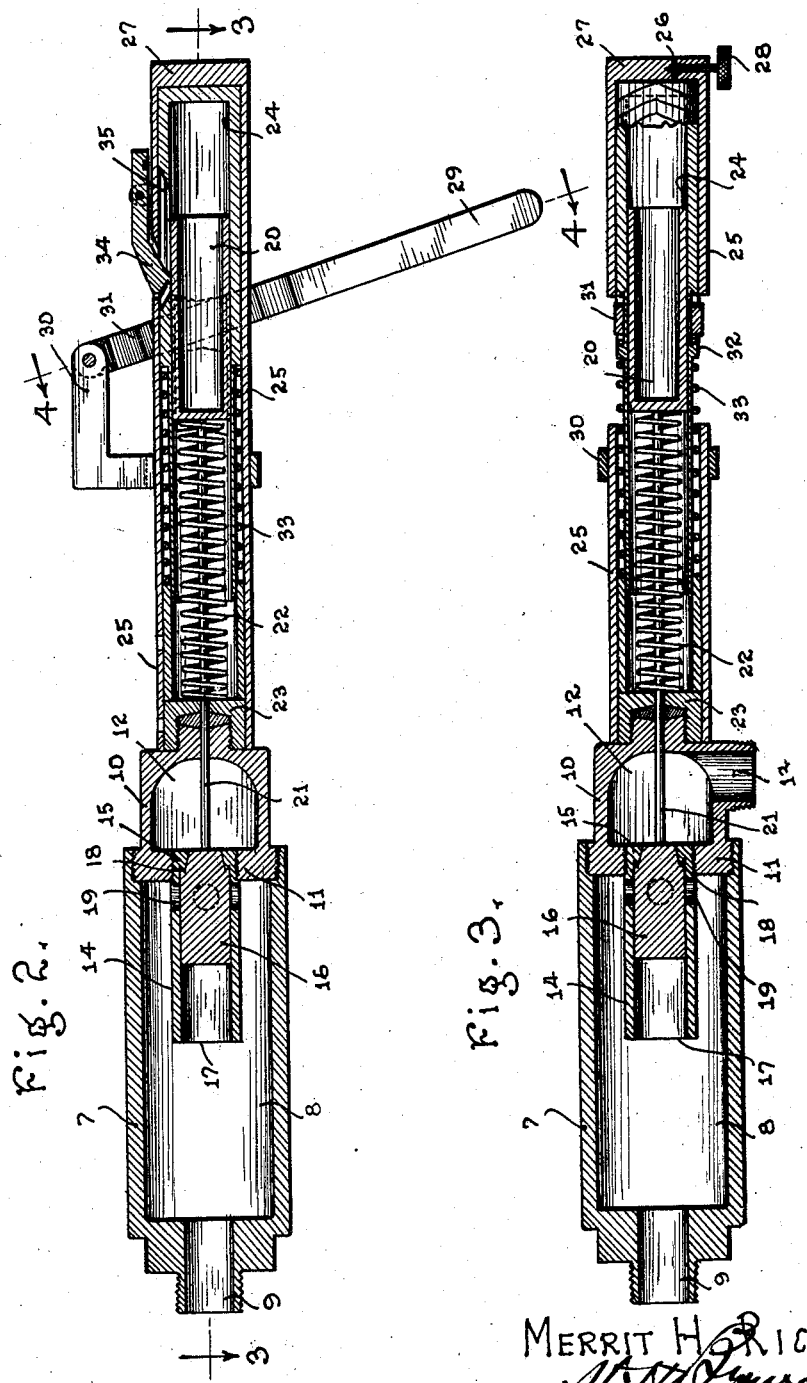
Inventor
MERRIT H. RICE
By
Attorney Jan. 13, 1931.　　　M. H. RICE　　　1,788,593
BALANCED VALVE
Filed Aug. 22, 1929　　3 Sheets-Sheet 3
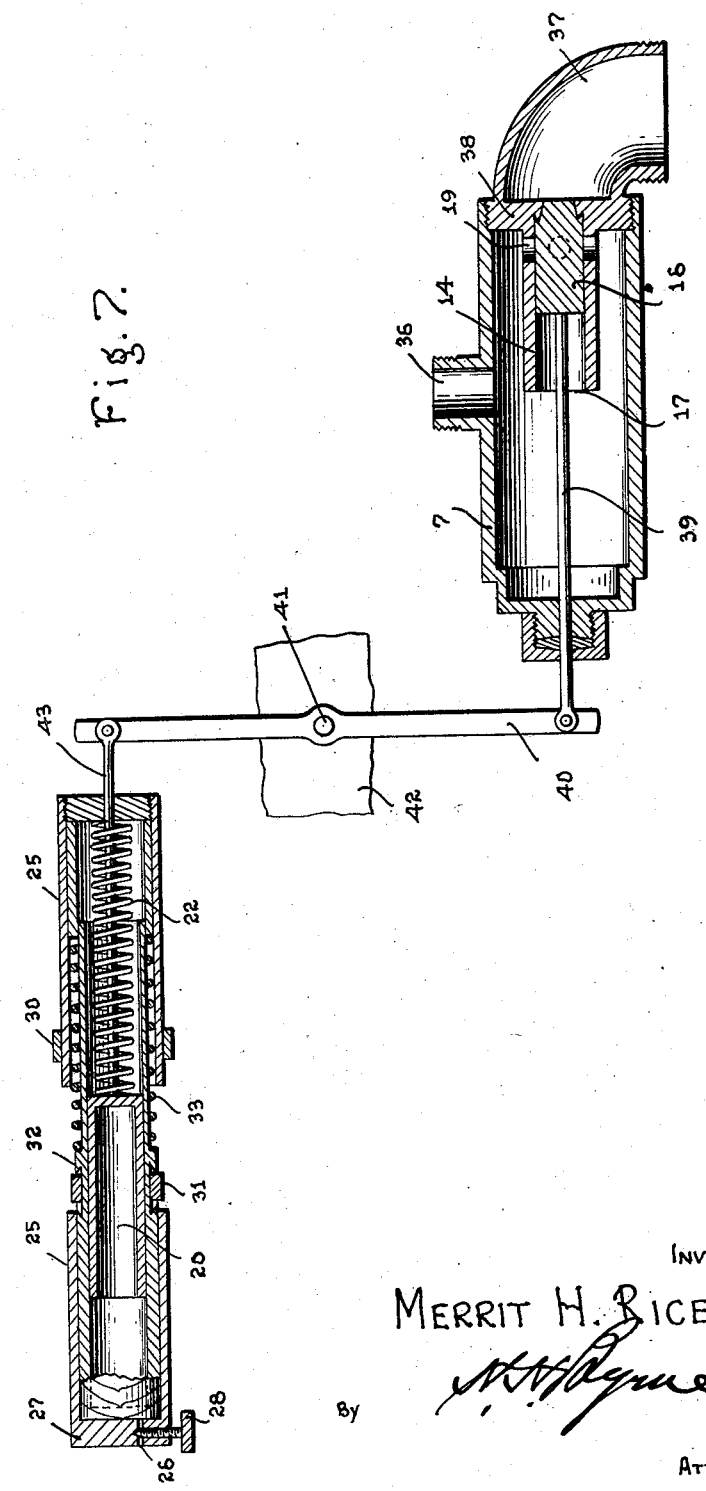
INVENTOR
MERRIT H. RICE
By
ATTORNEY.

Patented Jan. 13, 1931

1,788,593

UNITED STATES PATENT OFFICE

MERRIT H. RICE, OF PASADENA, CALIFORNIA, ASSIGNOR OF ONE-THIRD TO GEORGE R. LANGTREE AND ONE-THIRD TO EDWARD P. MELVIN, BOTH OF PASADENA, CALIFORNIA

BALANCED VALVE

Application filed August 22, 1929. Serial No. 387,663.

The present invention relates to balanced valves and operating means therefor, and consists in the combinations and arrangements of elements hereinafter described and particularly set forth in the accompanying claims.

The invention has for its purpose to provide a balanced and silently operating valve for bathroom and toilet fixtures which will eliminate the use of the present flushing tanks, and one wherein the control of flow of water, other liquids or gases may be easily regulated.

A further purpose of the invention is to provide a valve of the character which is adapted to close in the direction of flow of water or other pressure medium as distinct from against such flow which characterizes some present used valves; and the closing or seating of the valve under the source of pressure eliminates the use of all soft or composition washers which so easily become defective and consequently cause leakage with other attendant disadvantages.

It is a further purpose of the invention to provide a balanced valve of this type, and operating means therefor, which are of all metal construction and the several elements whereof are all designed to provide a compact, unitary and quietly operating plumbing fixture.

The invention is shown by way of illustration in the accompanying drawings, wherein:

Figure 1 is a side elevational view of the apparatus complete.

Figure 2 a longitudinal sectional view thereof taken on the line 2—2 of Figure 1.

Figure 3 a horizontal sectional view taken on the line 3—3 of Figure 2.

Figure 4 a transverse sectional view taken on the line 4—4 of Figure 2.

Figure 5 a similar view taken on the line 5—5 of Figure 1.

Figure 6 a transverse sectional view taken on the line 6—6 of Figure 1, and;

Figure 7 a longitudinal sectional view of the modified construction.

Referring to the construction in further detail and wherein like reference characters designate corresponding parts in the several figures shown, the apparatus consists of a cylinder 7 providing a receiving chamber 8 having an inlet port 9 adapted to communicate with any suitable source of supply of fluids or gases, and an outlet head 11 having its outlet through the balanced valve opening into the outlet chamber 12.

The open ended and tubular member 14 has a screw-threaded fitting 15 in the outlet head 11 of the receiving chamber and provides a cylinder and also a seat 15 for the piston 16 of the valve which controls and regulates the flow of fluids or gases from the receiving chamber 8 to the discharge chamber 12.

The open end 17 of the cylinder 14 permits the pressure within the chamber 8 to act against the piston valve 16 and thereby securely hold said valve on its seat 15, as shown. Said valve seat is formed with an annular groove 18 that co-acts with a complementary portion formed on the face of the valve; also the seat below the annular groove is shaped to fit the conical end of the piston of the valve thereby providing a secure and non-leaking closure. At diametrically opposite points the cylinder 14 is apertured as at 19 to permit the pressure of the liquids or gases in the receiving chamber to bear equally and uniformly against the piston 16 of the valve, and thereby balance the same. With this arrangement there is effectively prevented any likelihood of pounding, leakage, or unseating of the valve which characterizes those types wherein the valve seats or closes contrary to the direction of pressure supply.

The valve operating mechanism consists of piston rod 21 which is connected to the piston portion 16 of the valve. Said piston rod 21 has an elongated head 20 which fits perfectly within the control cylinder 24 and also acts to compress the spring 22 on the rod 21 as shown. Said spring 22 acts against the nut 23 that has screw-threaded engagement with the union piece 10 of the valve discharge.

The piston head 20 is mounted to have a limited reciprocation within the control cylinder 24 and said control cylinder 24 has in turn a limited reciprocating movement within inclosing cylinder 25 that is suitably mounted on the union piece 10 as shown. The said control cylinder 24 cooperates with the enclosing cylinder 25 to provide the pneumatic or compressed air chamber which controls and regulates the closing movement of the valve 16, and for this operation there is provided an air exhaust 26 in the head 27 of the cylinder. Said exhaust is controlled by the thumbscrew 28, as shown.

The means for manually unseating the valve consists of suitable lever 29 fulcrumed on the bracket arm 30 that is mounted on the cylinder or casing 25. Said lever 29 is bifurcated as at 31 to engage with the shoulder portions 32 that are formed on the control cylinder 24, and a spring 33 operates to retract or restore the control cylinder 24 when released.

When the control cylinder and entrapped air operate to move the piston 20 to unseat the valve 16 a detent 34, fulcrumed on the casing 25 engages the free end of said piston head 20 and holds the same until the predetermined flow of liquid or gas has been discharged whence the cut-away portion 35 of the control cylinder operates to lift the detent permitting the piston head 20 to move to its closing position under the influence of the two co-acting springs 22 and 33. It will therefore be seen from the foregoing that after the valve has been unseated through the manual control 29 it remains open sufficiently long to perform its function and thereafter is automatically actuated to close in a quiet and easy manner.

The exterior surface of the control cylinder 24 is provided with a plurality of grooves or channel-ways 36 adapted to receive oil or other lubricant.

In the arrangement shown in Figure 7 the construction of valve, controlling means therefor, and its manner of operation, are in all essentials the same as that described above. In this plan, however, the valve and its controlling mechanism are in two distinct or separate units disposed in offsetting or parallel relation and connected to function by a lever.

The cylinder 7 has a side inlet 36 and an outlet pipe 37 formed integral with the cylinder head 38. The rod 39 of the piston valve 16 connects with one arm of the lever 40 which is fulcrumed at 41 on a suitable support 42. The other arm of lever 40 connects with rod 43 of the piston member 20 as shown.

It is obvious that those skilled in the art may vary the details of construction and arrangement of parts without departing from the spirit of my invention, and therefore I do not wish to be limited to such features except as may be required by the claims.

What is claimed as new is:

1. An apparatus of the character described comprising a member providing a valve chamber and a valve seat, said chamber having inlet and outlet passages, a valve member cooperable with said seat alined cooperable and independently movable piston and plunger elements for unseating said valve and regulating the closing thereof, and means for actuating said elements, substantially as set forth.

2. An apparatus of the character described comprising a member providing a valve chamber and a valve seat, said chamber having inlet and outlet passages, a valve member co-operable with said seat, a spring tensioned piston carried by said valve, an alined and spring tensioned plunger associated with said piston, said plunger and piston being independently movable and cooperable for unseating said valve and regulating the closing thereof, and means for actuating said elements, substantially as set forth.

3. An apparatus of the character described comprising a member providing a valve chamber and a valve seat, said chamber having inlet and outlet passages, a valve member co-operable with said seat, a spring tensioned piston carried by said valve, a spring tensioned plunger providing a cylinder for said piston and operable for unseating said valve and regulating the closing thereof, and means for actuating said piston and plunger elements, substantially as set forth.

4. An apparatus of the character described comprising a member providing a valve seat, and having inlet and outlet passages; a valve, a spring tensioned piston connected to said valve, a spring tensioned plunger providing a cylinder for said piston, a fixedly mounted cylinder for the plunger, and means mounted on said fixed cylinder for actuating the plunger, substantially as set forth.

5. An apparatus of the character described comprising a member providing a valve seat, and having inlet and outlet passages; a valve, a spring tensioned piston connected to said valve, a spring tensioned plunger providing a cylinder for the piston and forming an air chamber therewith, manually controlled means for actuating the plunger to unseat the valve, and automatically controlled means for regulating the seating of the valve, substantially as set forth.

6. An apparatus of the character described comprising a valve member, a casing providing a valve seat, a plunger operable in the casing, a piston operable within the plunger, springs tensioning said piston and plunger respectively, and a lever for actuating the plunger, said plunger and piston cooperable under air pressure to unseat the valve, and said plunger and casing cooperable to retard the closing movement of the valve, substantially as set forth.

7. An apparatus of the character described comprising a valve member, a casing providing a valve seat, alined spring tensioned piston and plunger elements cooperable under air pressure for unseating the valve, and said spring tensioned plunger, piston, and the casing cooperable under the entrapped air to retard the closing movement of the valve.

In witness whereof, I have hereunto set my hand at Pasadena, California, this 3rd day of June, A. D. nineteen hundred and twenty-nine.

MERRIT H. RICE.